UNITED STATES PATENT OFFICE.

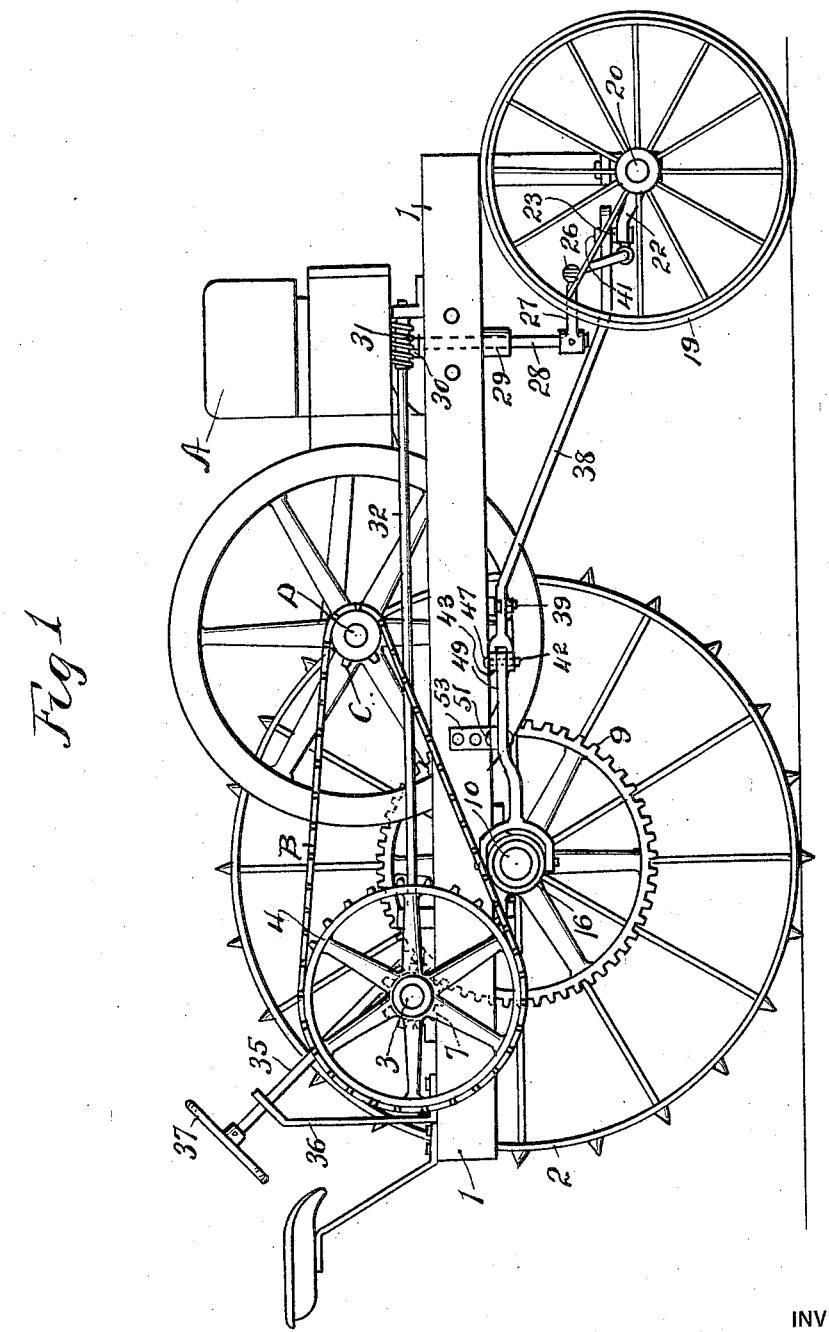

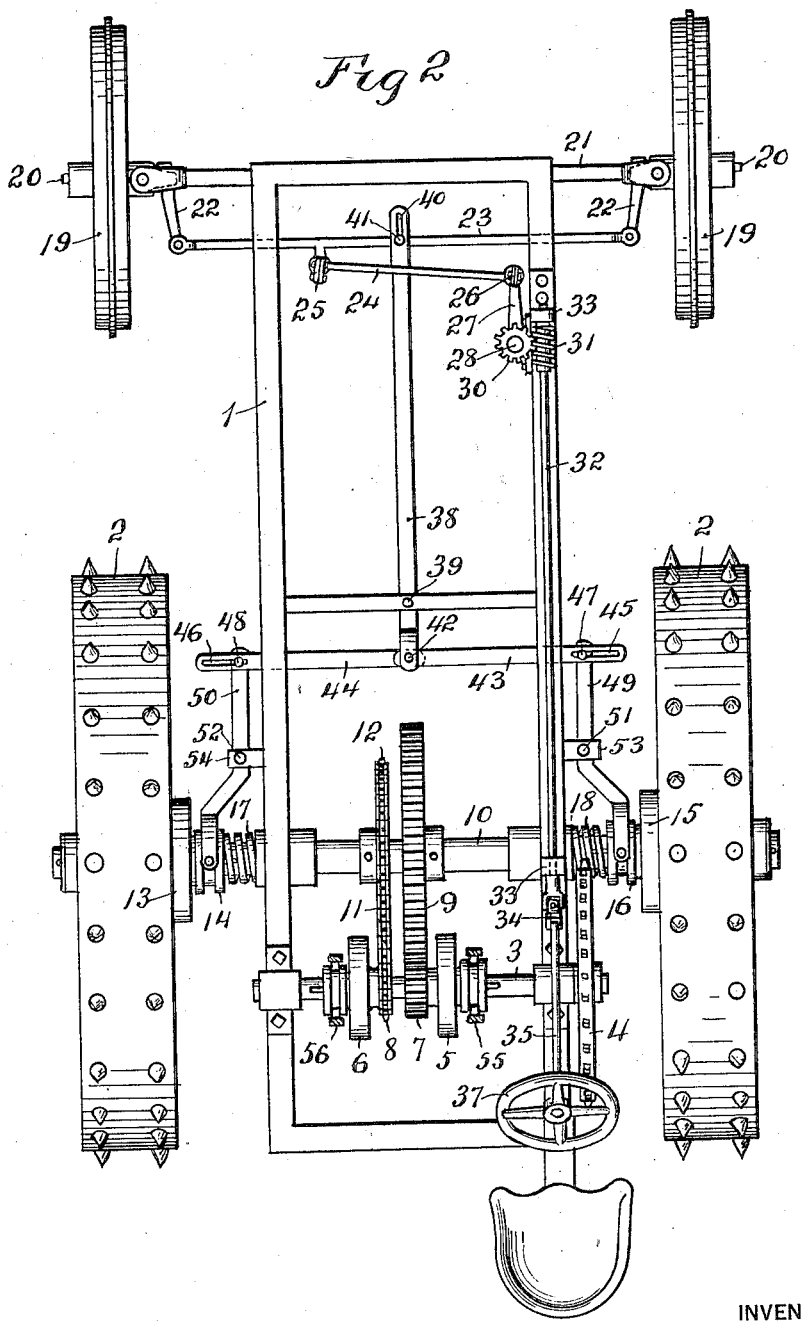

HILLIS A. HARRAH, OF KANSAS CITY, MISSOURI, ASSIGNOR OF ONE-HALF TO LIZZIE T. LEIMBACH, OF ROSEDALE, KANSAS.

TRACTOR.

1,384,952.   Specification of Letters Patent.   Patented July 19, 1921.

Application filed February 13, 1919. Serial No. 276,701.

*To all whom it may concern:*

Be it known that I, HILLIS A. HARRAH, a citizen of the United States, residing at Kansas City, in the county of Jackson and State of Missouri, have invented a certain new and useful Improvement in Tractors, of which the following is a specification.

My invention relates to improvements in tractors.

One of the objects of my invention is to retain the functions of the ordinary differential mechanism of a tractor and eliminating the differential mechanism. My invention also provides a single driving shaft and means operated by the tractor steering means for independently controlling driving connection between the shaft and the two traction wheels.

My invention provides further novel and simple mechanism operated by the tractor steering means for independently releasing the traction wheels from the driving mechanism of the tractor.

The novel features of my invention are hereinafter fully described and claimed.

In the accompanying drawings, which illustrate the preferred embodiment of my invention, Figure 1 is a side elevation of a tractor provided with my improvement.

Fig. 2 is a top view of the same.

Similar reference characters designate similar parts in the different views.

1 designates the tractor frame, 2 designates the usual two traction wheels.

Driving means, operated by the tractor engine for motor, A, is provided for independently rotating the traction wheels 2. In the preferred embodiment of my invention, such driving means comprises the following described parts.

3 designates a rotary shaft mounted on the frame 1 and having secured to it a sprocket wheel 4, which is rotated by a sprocket chain B connected with a sprocket wheel C on the crank shaft D of the engine, A.

5 and 6 respectively designate two clutches for independently locking the shaft 3 to a pinion 7 and a sprocket wheel 8, rotatably mounted on the shaft 3. The pinion 7 meshes with a gear wheel 9 secured to a rotary shaft comprising an axle 10, on which the traction wheels 2 are independently rotatable.

The sprocket wheel 8 is connected by a sprocket chain belt 11 with a sprocket wheel 12 secured to the axle 10. A clutch member 13 is secured to the left traction wheel 2 and is adapted to lockingly engage a clutch member 14 rotatable with and slidable on the axle 10.

A clutch member 15 is secured to the right traction wheel 2 and is adapted to lockingly engage a clutch member 16, rotatable with and slidable on the axle 10. Two coil springs 17 and 18 encircling the axle 10 respectively engage the clutch members 14 and 16 and normally force said members to the locking position.

19 designates the usual forward carrying steering wheel respectively rotatable in the usual manner on two spindles 20, pivoted to the front axle 21 and provided each with the usual steering arm 22, the said arms being connected with each other by the usual transverse bar 23, which is moved to the right and left in steering by a connecting rod 24 having one end connected by a universal joint 25 to the bar 23, the other end being connected by a universal joint 26 of a crank 27, which is secured to the lower end of a vertical shaft 28 oscillatably mounted in a bearing 29 secured to the frame 1, and which has secured to its upper end a worm wheel 30, which meshes with a worm 31 secured to and rotatable with a longitudinal shaft 32 rotatably mounted in bearings 33 mounted on the frame 1.

The rear end of the shaft 32 is connected by a universal joint 34, Fig. 2, with the lower end of an upwardly and rearwardly extending shaft 35, rotatably mounted in an upright standard 36, Fig. 1, on the frame 1. The upper end of the shaft 35 has secured to it a steering wheel 37.

A longitudinal lever 38 is pivoted near its rear end by means of a vertical pin 39 to the frame 1. Near its forward end, the lever 38 is provided with a longitudinal slot 40, through which extends a vertical pin 41 which is secured to the bar 23.

The rear end of the lever 38 is pivoted by a vertical pin 42, Fig. 2, to the inner ends of two transverse horizontal bars 43 and 44. The bars 43 and 44 are provided at their outer ends respectively with longitudinal slots 45 and 46, through which respectively extend two vertical bolts 47 and 48, which are respectively secured to two longitudinal levers 49 and 50, respectively pivoted intermediate of their ends by vertical pins 51 and 52 to two brackets 53 and 54, which are secured to opposite sides respectively of the frame 1.

The rear end of the lever 49 is bifurcated and its arms engage in the usual manner the peripherally grooved clutch member 16, so as to permit the lever 49 to slide the clutch member 16 out of engagement with the clutch member 15.

The rear end of the lever 50 is bifurcated and engages the peripherally grooved clutch member 14 so as to slide the latter out of engagement with the clutch member 13.

The gears 7 and 9 drive the axle 10 in the forward direction. The sprocket wheels 8 and 12 and chain 11 reverse the axle 10.

When the carrying steering wheels 19 are in the straight ahead position, shown in the drawings, the levers 38, 49 and 50 will be in the neutral or middle position shown. Upon turning the steering wheel 37 so as to swing the front wheels 19 to the right, the bar 23 will be shifted to the left, thereby swinging the rear end of the lever 38 to the right, thus swinging the lever 49, through the intermediacy of the bar 43, so as to move the clutch member 16 out of engagement with the clutch member 15. Driving connection between the traction wheel 2, at the right side, and the axle 10 will be disestablished. The left traction wheel 2 will, however, be engaged with the axle 10 through the clutch members 13 and 14 and will drive the tractor forwardly and to the right.

If the steering wheel 37 is turned counter clockwise, so as to shift the bar 23 to the right, the wheels 19 will be turned to the left. At the same time the lever 38 will have its rear end swung to the left, thereby drawing the bar 44 inwardly and swinging the lever 50 so as to move the clutch member 14 out of engagement with the clutch member 13. The left wheel 2 will now be disengaged from the axle 10, while the right wheel 2 will be locked to the axle. The right wheel 2 will, therefore, drive the tractor ahead and to the left, when the clutch member 5 is in the locking position, thus causing the gear wheels 7 and 9 to drive the axle 10 forwardly.

The clutch members 5 and 6 may be slid on the shaft 3 to and from the locking positions by suitable levers 55 and 56 respectively, Fig. 2.

The slots 45 and 46 in the bars 43 and 44 are provided so that the bar 43 may be slid to the right without having the bar 44 swing the lever 50, and so that the bar 44 may be slid to the left without having the bar 43 swing the lever 49.

I do not limit my invention to the structure shown and described, as modifications, within the scope of the appended claim, may be made without departing from the spirit of my invention.

What I claim is:—

In a tractor, a rotary axle, two traction wheels independently rotatable thereon, two clutches for respectively locking said wheels to said axle, two springs for respectively forcing said clutches to the locking position, a carrying steering wheel, steering means for turning said wheel to the right and left, a lever oscillatable by said steering means, two levers for respectively releasing said clutches, and two bars pivoted to said lever and respectively slidably and pivotally connected to said two levers so as to swing the same one independently of the other.

In testimony whereof I have signed my name to this specification.

HILLIS A. HARRAH.